United States Patent
Shemer et al.

(10) Patent No.: US 11,595,282 B2
(45) Date of Patent: Feb. 28, 2023

(54) NETWORK ANOMALY DETECTION

(71) Applicant: Google LLC, Mountain View, CA (US)

(72) Inventors: Mikhal Shemer, Tel Aviv (IL); Roee Engelberg, Tel Aviv (IL); Yonit Tova Halperin Worzel, Tel Aviv (IL); Alex Gontmakher, Holon (IL); Alexander Goldshtein, Tel Aviv (IL); Gal Elidan, Modiin (IL); Benjamin Dov Kessler, Jerusalem (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/381,909

(22) Filed: Jul. 21, 2021

(65) Prior Publication Data

US 2022/0029902 A1 Jan. 27, 2022

Related U.S. Application Data

(60) Provisional application No. 63/054,493, filed on Jul. 21, 2020.

(51) Int. Cl.

| | | |
|---|---|---|
| *G06F 15/173* | (2006.01) | |
| *H04L 43/0817* | (2022.01) | |
| *G06F 9/455* | (2018.01) | |
| *G06K 9/62* | (2022.01) | |
| *H04L 41/0604* | (2022.01) | |

(Continued)

(52) U.S. Cl.
CPC ...... *H04L 43/0817* (2013.01); *G06F 9/45558* (2013.01); *G06K 9/6256* (2013.01); *H04L 41/0627* (2013.01); *H04L 41/0631* (2013.01); *H04L 43/065* (2013.01); *G06F 2009/45575* (2013.01); *G06F 2009/45595* (2013.01)

(58) Field of Classification Search
CPC ............ H04L 41/0627; H04L 41/0631; H04L 43/065; H04L 41/145; H04L 43/0817; H04L 41/16; H04L 41/0686; H04L 41/142; H04L 63/1425; G06F 2009/45575; G06F 9/45558; G06F 2009/45595; G06F 21/577; G06K 9/6256; G06N 3/0454; G06N 3/0472; G06N 3/08; G06N 20/20

See application file for complete search history.

(56) References Cited

U.S. PATENT DOCUMENTS

| | | | |
|---|---|---|---|
| 11,403,131 B2* | 8/2022 | Mohapatra | G06F 9/445 |
| 2019/0260794 A1 | 8/2019 | Woodford et al. | |

(Continued)

OTHER PUBLICATIONS

International Search Report and Written Opinion for International Application No. PCT/US2021/042587 dated Oct. 15, 2021. 15 pages.

*Primary Examiner* — John B Walsh
(74) *Attorney, Agent, or Firm* — Lerner, David, Littenberg, Krumholz & Mentlik, LLP

(57) ABSTRACT

A cloud network is a complex environment in which hundreds and thousands of users or entities can each host, create, modify, and develop multiple virtual machines. Each virtual machine can have complex behavior unknown to the provider or maintainer of the cloud. Technologies disclosed include methods, systems, and apparatuses to monitor the complex environment to detect network anomalies using machine learning techniques. In addition, techniques to modify and adapt to user feedback are provided allowing the developed models to be tuned for specific use cases, virtual machine types, and users.

20 Claims, 8 Drawing Sheets

(51) Int. Cl.
   *H04L 41/0631* (2022.01)
   *H04L 43/065* (2022.01)

(56) References Cited

U.S. PATENT DOCUMENTS

| | | |
|---|---|---|
| 2019/0372827 A1 | 12/2019 | Vasseur et al. |
| 2020/0028862 A1 | 1/2020 | Lin et al. |
| 2020/0076677 A1 | 3/2020 | Mermoud et al. |
| 2021/0160262 A1* | 5/2021 | Bynum .................. H04L 43/16 |

* cited by examiner

NETWORK ANOMALY DETECTION

CROSS-REFERENCE TO RELATED APPLICATIONS

The present application claims the benefit of the filing date of U.S. Provisional Patent Application No. 63/054,493 filed Jul. 21, 2020, the disclosure of which is hereby incorporated herein by reference.

BACKGROUND

Modern cloud environments can contain a very large number of virtual machines (VMs). Cloud systems or cloud environments are maintained by a cloud operator or owner. Often, a portion of the cloud environment or the virtual machines belong to different users or user groups. Each virtual machine on the cloud environment can deploy various applications specific to the user or user group to which it belongs. The physical structure on which the cloud environment is executed, which is typically owned by the owner of the cloud provider, may include tens or hundreds of data centers which may be distributed across the globe. In this complex and dynamic environment, maintaining a Service Level Objective (SLO) may present challenges. SLOs can be composed of parameters and metrics defining service levels for each element of a cloud solution that should be maintained, often codified in service agreements between users and cloud environment providers.

Virtualization is a process in which software based functions or services can be separated from hardware. Typically, software known as a hypervisor "sits" on top of physical hardware and abstracts the resources of the physical hardware, such as memory, computing power, and storage. Once abstracted, these virtual resources can be allocated into centralized pools of VMs, which may be considered clouds or the building blocks that form a cloud. Access to these resources can be provided by cloud providers along with the ability to rent or use those resources and create specialized virtual machines using those resources.

Further, cloud environments typically include a module that determines the state of various components of the system by analyzing data related to the components in real time. These modules may be used to determine in real time whether a given event such as anomaly is occurring or has occurred, state of a component of the cloud environment, or the cloud environment as a whole.

SUMMARY

Aspects of the present disclosure include methods, systems, and apparatuses for network anomaly detection.

Aspects of the present disclosure provide for obtaining a state of a network, including, obtaining network parameters in real time, selecting a first model to determine a state of the network, selecting a second model to detect a state of the network upon detecting a change in a network pattern, wherein detecting the change is based on at least a current network parameter, evaluating in real time, near real time, or at discrete or predetermined intervals, the state of the network, based on the obtained network parameters using at least one of the first model or second model, providing to a user device, an actionable notification, upon to evaluating that the state of the network meeting a predetermined state. The actionable notification can indicate the current status of the network. At least one of the first model or the second model can be trained using machine learning. In some examples, real time can be within a fixed amount of time, such as within a few seconds, minutes, or other period of time.

Additional aspects of the disclosed technology provide for a third model which can be used to evaluate the state of the network responsive to a user response to the actionable notification. The predetermined state can be an anomalous state. The third model can be used based upon detection or presence of a condition external to the network. The first model or other models can be retrained upon a change in the base behavior or other change in a virtual machine hosted on the network. The selection of a model used to evaluate a network condition can occur at predetermined time intervals. Multiple models can be applied on multiple network entities simultaneously to infer the state of the network and infer or derive the state of a specific user network.

Additional aspects of the disclosed technology provide for a non-transient computer readable medium containing program instructions, the instructions when executed perform the steps of obtaining network parameters in real time, selecting a first model to determine a state of the network, selecting a second model to detect a state of the network upon detecting a change in a network pattern, wherein detecting the change is based on at least a current network parameter, evaluating in real time the state of the network, based on the obtained network parameters, using at least one of the first model or second model, providing to a user device, an actionable notification, upon to evaluating that the state of the network meeting a predetermined state, wherein the actionable notification indicates the current status of the network; and wherein at least one of the first model or the second model are trained using machine learning.

Aspects of the disclosed technology include any combination of the following features. Aspects of the disclosure include a method, non-transient computer readable medium containing instructions, the instructions when executed capable of performing the following steps, or a system, the system configured to undertake or perform the following steps.

Aspects of the disclosure include obtaining a state of a network. The method can comprise obtaining data related to network parameters, evaluating a current state of the network, based on the obtained data, by using at least a first model, providing to a user device, an actionable notification, upon determining that the evaluated state of the network meets a predetermined state. The actionable notification can indicate the current state of the network. The first model can be trained using machine learning to establish a baseline behavior of the network.

A second model or multiple models are selected and used to evaluate the state of the network. The first model and a second model can be used to evaluate the current state of the network and can be selected or adjusted according to the presence of a condition internal to the network or a condition external to the network.

Evaluating the current state of the network can comprise at least one of: aggregating or generating a severity score based on multiple models; evaluating a portion percentage of virtual machines or groups of virtual machines impacted by an event within the network; evaluating the presence of an event based on a comparison of a network parameter or a group of network parameters or to a threshold value; and/or evaluating the presence of an event based on an aggregation of the network parameters for a group of virtual machines and a comparison of the aggregated network parameters to a threshold value. The predetermined state can be an anomalous state or a user defined state. An action can automatically be taken upon determining that the current state of the network meets a particular predetermined state.

The first model can be trained or retrained based on the parameters of the network elements. The first model can be re-trained upon a change in a virtual machine hosted on the network. The network parameters can be obtained in real time. The actionable notification can cause a user's network or virtual machine to perform an action. The action can be one of (i) restarting the network, (ii) changing security protocols, (iii) changing firewall rules, (iv) stopping or slowing egress or ingress of traffic.

The machine learning of the first model can comprise generating weights for network parameters and evaluating the network involves evaluating multiple network parameters simultaneously.

A cause for the anomalous network condition can be determined using the evaluated current state of the network and the data related to the network parameters. The evaluation of the current state of the network can distinguish between an anomalous condition for the network and a malfunction within a virtual machine or group of virtual machines corresponding to a user of the network. Feedback to an actionable notification can be used to adjust a threshold used in evaluating the current state of the network or to retrain the first model.

Aspects of the disclosed technology include a non-transient computer readable medium containing program instructions, the instructions when executed perform the steps of obtaining data related to network parameters; evaluating the current state of the network, based on the obtained data, by using at least one a first model; providing to a user device, an actionable notification, upon determining that the evaluated state of the network meets a predetermined state. The actionable notification can indicate the current state of the network. The first model can be trained using machine learning to establish a baseline behavior of the network.

A second model or multiple models are selected and used to evaluate the state of the network. The first model and a second model can be used to evaluate the current state of the network and can be selected or adjusted according to the presence of a condition internal to the network or a condition external to the network. The computer readable medium containing program instructions can include machine learning of the first model comprises generating weights for network parameters and evaluating the network involves evaluating multiple network parameters simultaneously. The predetermined state can be an anomalous state. A cause for the anomalous network state can be determined using the evaluated current state of the network and the data related to the network parameters.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1A:
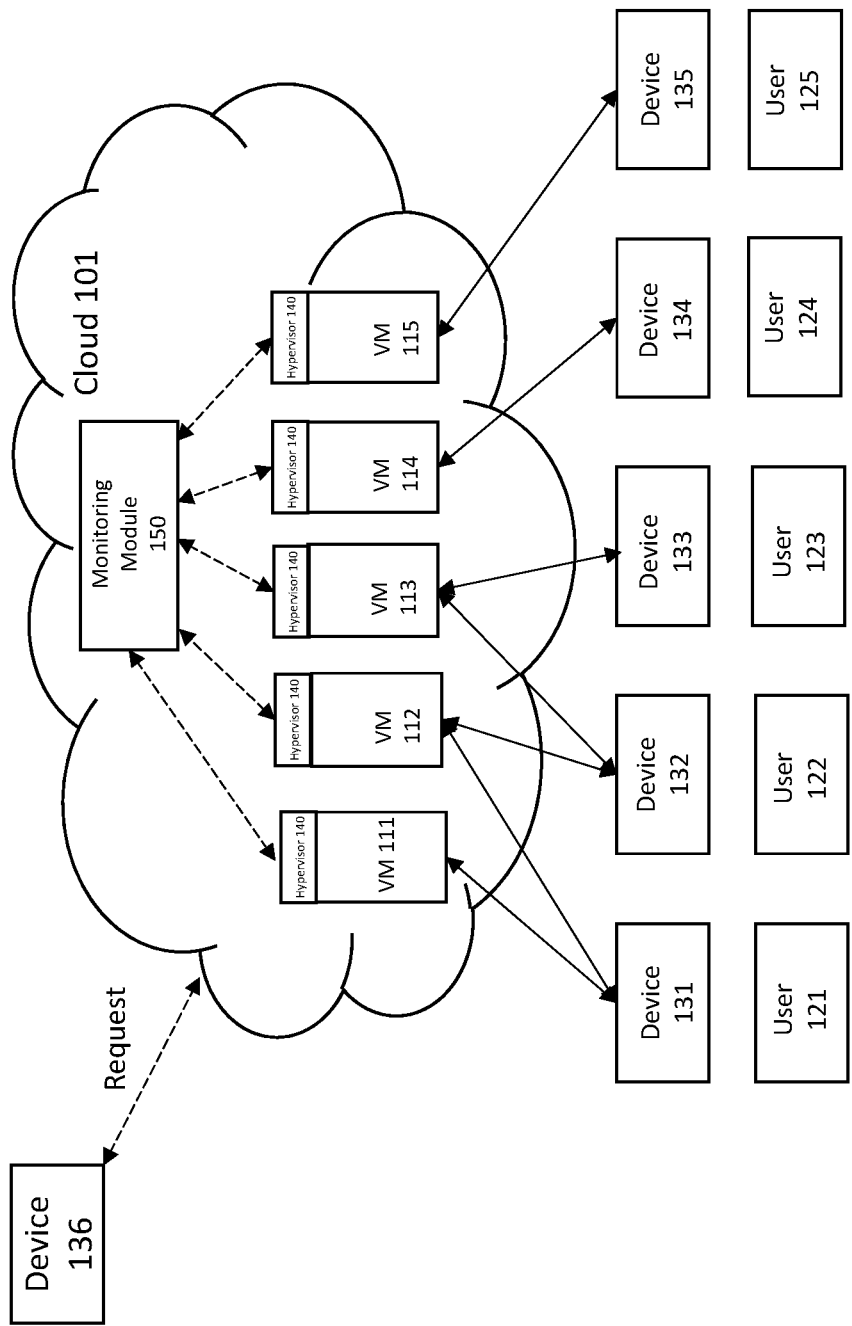
FIG. 1A illustrates a schematic view of a network 100.

The disclosed technology in one aspect may comprise detection tools which utilize aspects of machine learning and artificial intelligence to detect anomalous events or activity in a network. Detection tools for detecting anomalies within a system or components of a system suffer from challenges due to the complexity, variety, scalability, agility, and user demands on the network. Scalability can refer to the number of elements or components within a system or network, such as for example, the number of virtual machines, routers, computers, ASICs, the amount or volume of traffic in the network, or other components. Dynamics can refer to traffic patterns, as well as changes in applications running on the system or cloud, including software modules, software versions, and other changes over time. Dynamics can also refer to the changes made by a user on the virtual environment or virtual machine owned by the user, which can occur without providing notice of that change or information related to that change by the user to the proprietor of the cloud. Similarly, information stored by cloud users may not be accessible to the cloud operator, which further adds to the complexity of developing detection tools.

For instance, the disclosed technology may comprise a detection tool for use in scalable and dynamic environments such as within a cloud environment, in which static methods of detecting anomalous network events may not perform well enough to provide real time monitoring of the network or network traffic. Typically, such static methods of detecting anomalous network events focus on a singular property of a network. The technology disclosed herein can use multivariate and evolving properties of networks to detect anomalous network events. The disclosed technology may also provide meaningful and actionable information or alerts to cloud users, and integrating responses to the information or alerts into the tools for detecting anomalous events.

An aspect of the disclosed technology is provision of detection tools that allow for actual selection of parameters to monitor and may be used across various virtual machines or virtual environments. Within the cloud system can exist hundreds or thousands of parameters, all of which can be monitored. For example, there are many different elements in the cloud environment, and each element can be associated with multiple variables, quantities, and characteristics. Aspects of the disclosed technology provides as an advantage the flexibility to select and monitor a varied set of parameters.

In some examples of the disclosed technology, metrics, parameters, or properties of the network collected or analyzed to detect network anomalies can be compared to a past model based on customer behavior and alerting the user when a significant change occurs in real time. In some examples, the alert can be based on a tunable or adjustable threshold over which an alert is generated.

In some examples, the technology disclosed provides for a robust machine learning information technology infrastructure monitoring tool to address the challenges of providing meaningful information to cloud customers, internal operational teams of cloud regarding the quality of service, and customer service. In other examples, the technology disclosed herein can inform customers of the quality of their applications. The technology disclosed addresses the challenges regarding implementation of a tool which is generally applicable to the large scale of cloud providers, which can number in the tens of thousands of cloud customers, all of whom can have different traffic levels, number of virtual machines, amount of traffic, traffic patterns, software, use cases, upgrade schedules, geographical distribution patterns, and include external malicious attacks.

In some examples, the technology disclosed herein provides for selection of parameters to monitor within a network. A network may have hundreds or thousands of parameters. Further, even more parameters or predictors can be generated based on the observed parameters. Each virtual machine or cluster of virtual machines within a network may have different parameters which are more indicative or relevant to the applicability of detecting network anomalies for that particular virtual machine. Example network parameters can include for example, packet or throughput counters for ingress and egress, flow counters, loss, and latency.

In some examples, the technology disclosed herein provides for the production of generally applicable machine learning models. In some examples, the models can be generated using machine learning techniques. In some examples, the generally applicable model can be used to generally monitor the network traffic to a cloud. In some examples, the model can be customized to certain aspects of the network, such as a locality in which physical servers of the network are located.

In other examples, the technology disclosed herein provides for the production of a tailored or selected machine learning generated detection model for a particular user, virtual machines, or cluster of virtual machines. In some examples, the particular model used to detect anomalies on a virtual machine or a network can be selected based on characteristics of that virtual machine, owner of the virtual machine, or user of the virtual machine.

In some examples, trained or generated detection models can be reassigned to virtual machines based on updated or changing characteristics of a particular virtual machine.

In addition, information or analysis performed by a detection tool is provided in a meaningful and actionable way to users. In some examples, information or analysis performed by one or more tools can provide alerts to a user or consumer of a cloud.

In some examples, an underlying event or events causing an anomalous condition in a network can be identified. In some examples, clustering based on network features can be used to identify an anomaly or to identify the source, root, or cause of an anomaly. In other examples, the source or the cause of the anomaly can be identified.

In other examples, the technology can be used as part of an investigation. For example, if a user is investigating an issue and believes that an anomaly signal is valid, the lack of an anomaly may allow the user to discount certain potential causes of an anomaly and focus on the investigation of other causes of an anomaly.

In some examples, there is no need to have the entirety of the network data in order to infer the state of a network, and a subset or a sample of the network data can be used. In other examples, multiple network features can be evaluated simultaneously to generate a high fidelity or robust input which can be used to evaluate the network status or condition. Various network features can be weighted or discounted in different ways, such as through human experience, algorithms, or machine learning techniques to tune, customize, or determine which events the systems can identify. In other examples, characterization of an anomaly and determining the root cause for an anomaly can be determined using the network features and state. In other examples, the system can distinguish between a customer problem and a system malfunction.

As used in this disclosure, a cloud user, cloud consumer, or cloud customer can refer to an individual, organization, or other entity which can purchase, rent, or subscribe to cloud resources. A cloud provider can refer to an organization, company, or entity which provides cloud based services to customers, users, or consumers.

Example Systems

FIG. 1 illustrates a schematic view of an example of a network 100 with cloud 101, virtual machines 111-115, and devices 131-135 respectively associated with users 121-125. Cloud 101 can contain hardware which can include, for example, networking equipment, like switches, routers, firewalls, load balancers, storage arrays, backup devices, and servers. Cloud 101 can be thought of as an abstraction which connects servers together, dividing and abstracting resources to make them accessible to users. Cloud 101 can contain a monitoring module 150, a hypervisor 140, and virtual machines 111-115.

Although cloud 101 is represented as a singular entity, a person of skill in the art should understand that cloud 101 is a conceptualization of distributed hardware and software systems. Cloud 101 can consist of other clouds. In other examples, cloud 101 can be a virtual machine or a virtual cloud which is itself located within another cloud. In some examples, cloud 101 can be distributed or divided across a plurality of physical locations, such as datacenters, which can be interlinked or interconnected. In other examples, portions of cloud 101 can be hosted offsite. For instance, in some examples, computer processing or computational hardware for cloud 101 can be located in one location while storage mediums can be located in other areas. Examples of computational and storage mediums are disclosed herein with reference to FIG. 3.

Cloud 101 can also be configured such that aspects of the cloud environment are controlled. For example, cloud 101 can contain software which responds to user demands or requests, such as increasing or decreasing the size of a virtual machine, the amount of resources dedicated to a virtual machine, or the number of virtual machines available to a given user.

Cloud 101 can contain a number of virtual machines 111-115. Generally, a virtual machine is an emulation of a computer system or computer network. Virtual machines are based on computer architectures and can provide the functionality of a physical computer. An implementation may involve specialized hardware, software, or a combination. Each virtual machine 111-119 can be hosted or run on a cloud. In some examples, a virtual machine can be instantiated responsive to a user request. In some examples, each virtual machine can be a cluster of virtual machines.

Cloud 101 can also contain a hypervisor 140. A hypervisor is also known as a virtual machine monitor, a VMM, or a virtualizer. A hypervisor is a piece of computer software, firmware, or hardware that can create, run, or monitor virtual machines. In some examples, only certain types of information about the virtual machines in cloud 101 can be accessible to hypervisor 140.

Each virtual machine can be managed by a user 121-125. Each user can access his or her corresponding virtual machine through tools provided by the cloud provider, such as through user devices 131-135. In some examples, this occurs through the use of a web interface, such as web-interface 141, which is typically provided by the cloud provider. In other examples, specialized software installed on a user device can be used to interact with the cloud or a particular virtual machine. User devices 131-135 can be similar to computing system 310, described below with reference to FIG. 3.

User device 136 can be a device which is not controlling or subscribed to the virtual machines of cloud 101, but can access information or resources of the clouds. In some examples, a user device 136 can make a request or attempt to access resources which are hosted on cloud 101. For example, user device 136 may attempt to make a particular request using a web interface which can in turn be routed to a particular virtual machine on cloud 101.

Each virtual machine, or cluster of virtual machines can be running one or more applications, software, operating system, and store data. In addition, requests from users to the cloud, to one or more virtual machines, or between virtual machines can generate network data or traffic. At times, the amount and type of network data or traffic can be within expected or normal network parameters. In some examples, expected or normal network parameters are based on a particular virtual machine or virtual machines associated with, which is the set of data which can be used for training a machine learning model. In some examples, thus, there is no "global" norm for the cloud or an expected value for the amount of network data and rather customized per. In some examples, expected or normal can be understood to mean a behavior or operating state which is consistent with the past observed behavior of a specific virtual machine. Thus, expected or normal can be understood to mean a baseline against which the behavior or a particular virtual machine or parameters related to that machine have changed. In some examples, anomalous behavior is thus defined against the baseline behavior as a relative change from the baseline behavior of a network. There need not be an expected value or global behavior which needs to be predefined. Yet, at other times, the network data or traffic can be unexpected or anomalous, such as during a denial of service attack, an intrusion by an unauthorized user in the network or virtual machine, through a blacklisted IP address, or anomalous when the usage pattern changes, as in, a benchmark being run, new workload coming online to a virtual machine, or being taken down from a virtual machine. Other examples can include when a key component of the network fails, misconfiguration of a machine or group of machines occurs, software versions are corrupt, outdated, or not present in some of the virtual machines or in a group of virtual machines. In some examples, the network traffic pattern to or from the effected machines may change. As one example, the number of connections a virtual machine may have may increase, the total traffic sent to or from that virtual machine may drop, or the value of the average round trip delay (RTT) may increase.

Figure 1B:
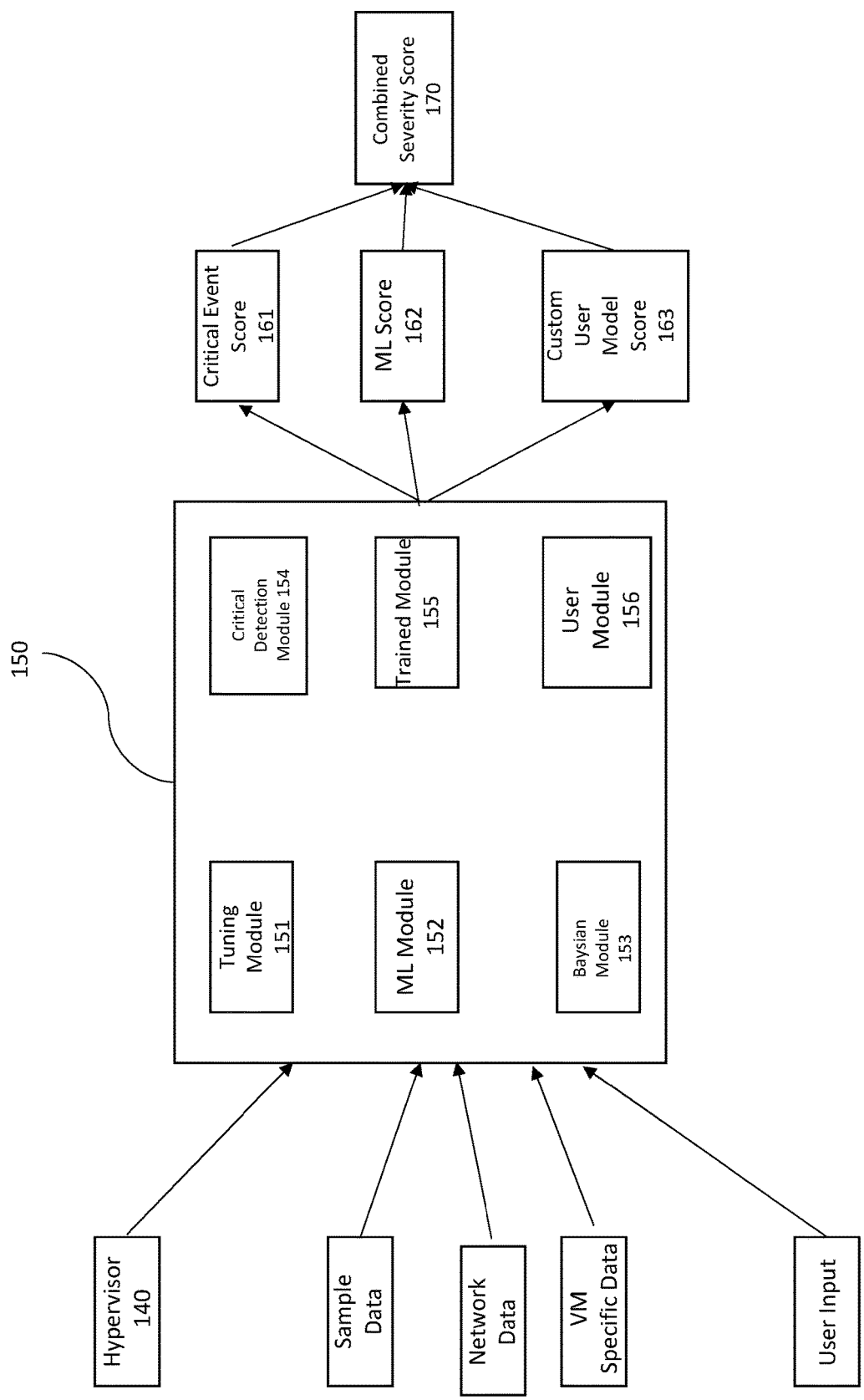
FIG. 1B illustrates aspects of a monitoring module 150

FIG. 1B illustrates aspects of monitoring module 150. Module 150 can be composed of a plurality of software modules, such as for example, Tuning Module 151, ML Module 152, Bayesian Module 153, Critical Detection Module 154, Trained Module 155, or User Module 156. A person of skill in the art should understand that the names used and descriptions of these models are only examples, and a wide variety of statistical, machine learning, and adaptive modules can be used as part of monitoring module 150. Module 150 can receive input from hypervisor 140 and other data sources, such as those described in this disclosure and in FIG. 1B. For example, Tuning Model 151 can be used to modify the behavior or generation of statistics from monitoring module 150 based on received user feedback. ML modules 152 can be machine learning related models and software modules. Bayesian Module 153 can provide additional information related to Bayesian or other statistical techniques. Critical Detection module 154 can contain specialized software for detecting critical events in the network, a virtual machine, or cloud. In some examples, critical detection module 154 can contain trained machine learning models or modules which have been trained on classified or tagged network data, such as for example, "critical" or "normal." In some examples, the critical detection module can be based on software which determines a moving average of data, the total amount of data, number of active connections, or based on characteristics derived from "tagged" events previously determined to be critical.

Trained modules 155 can contain a class of trained or trusted modules for a particular use case or short term behavior of the network. In some examples, the models can be trained using network parameters and a state of the network, such as for example, normal, anomalous, or suspicious. The network parameters can include for example, IP address, Subnet Mask, default Gateway, DNS Server and Host Name, node status, public or private cloud, throughput, response time, waiting time, network topology, average traffic data, time series analysis of network, round trip time, packet retransmits, packet size distribution, number of new connections, and rate of increase or decrease in the number of connections, or time-series derived or related to these parameters. User model 156 can contain additional models which are generated or specific to a specific virtual machine, use case, or user. User model 156 can be based on the type of historical use cases associated with a user's use of a virtual machine or based on data or feedback obtained from a user when using his or her virtual machine. The data obtained can be used to analyze or train a user model based on a dataset of the underlying software being used on a virtual machine, type of user, typical use characteristics, or other user specific data and a known or obtained state of the user machine. Monitoring module 150 can output a variety of scores, such as for example, critical event score 161, ML score 162, or customer user model score 163. Scores 161-163 can be combined into a combined severity score, such as combined severity score 170, which can provide an overall indication of the performance and status of the network.

Figure 2A:
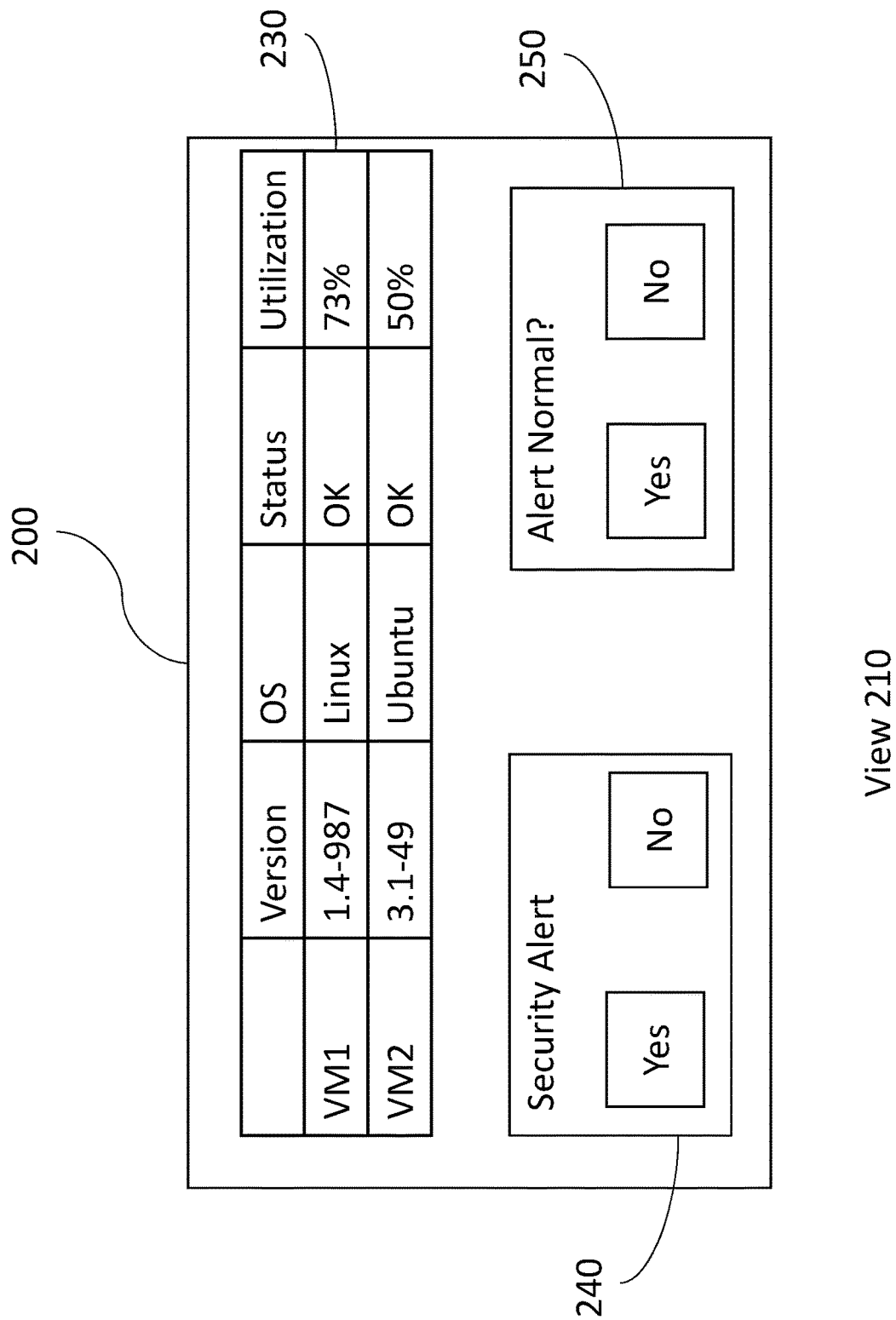
FIG. 2A illustrates aspects of user interface 200.

FIG. 2A illustrates a user interface 200. User interface 200 can be displayed on any of user devices 131-135. The user interface allows a user to manage his or her virtual machine or machines. In addition, user interface 200 can provide additional information according to aspects of this disclosure, such as those discussed below in reference to "Example Methods."

User interface 200 can display information about one or more virtual machines to which the user is permitted to interact with or access. View 210 of user interface 200 can display for example Table 230. Illustrated in Table 230 is some information about two virtual machines, VM1 and VM2, including information related to the virtual machines, such as the version, software running, their status, utilization, speed, IP Address. A user can configure additional information about the user interface. Alerts 240 and 250 illustrated in FIG. 2A can provide alerts to a user through user interface 200. Alerts 240 and 250 can be generated by a user device or displayed responsive to alerts received through the technology described herein. In some examples, alerts 240 and 250 can be interacted with by a user. Upon receiving a response from the alert, one or more components of cloud 101 can take an action responsive to the response.

Figure 2B:
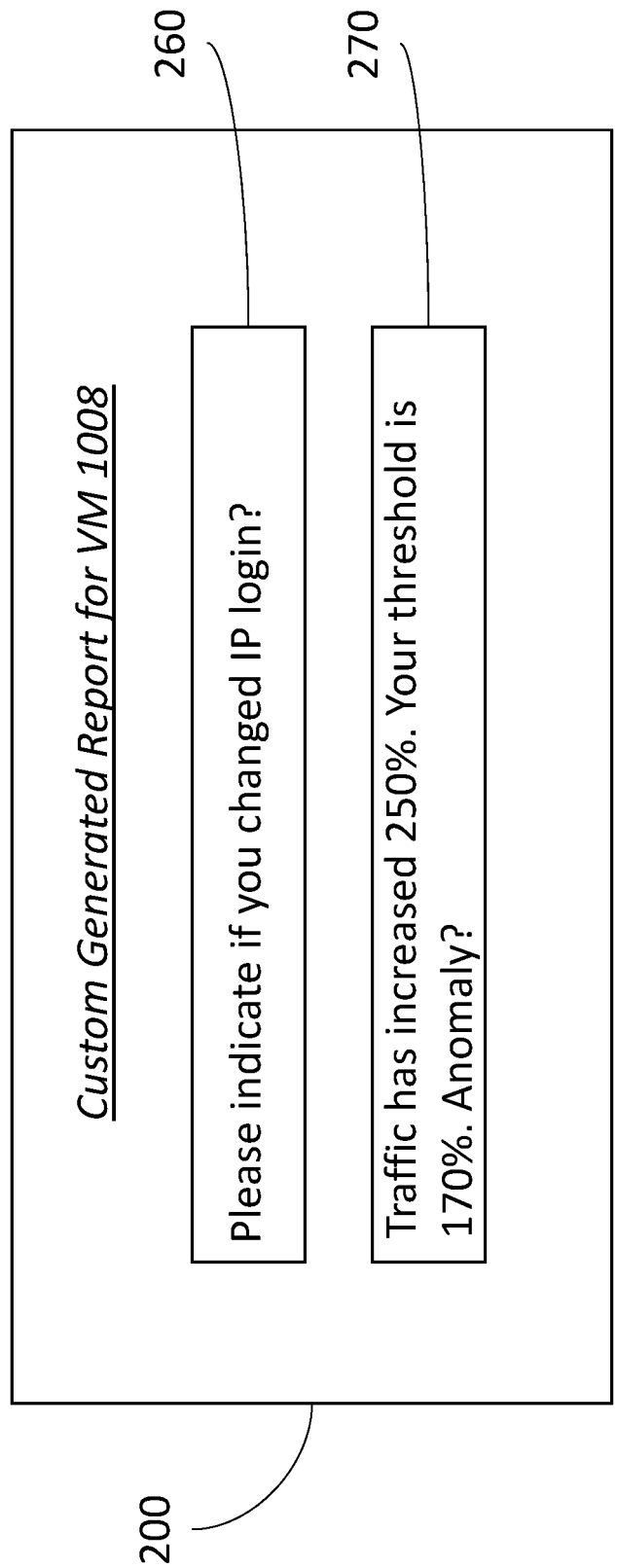
FIG. 2B illustrates aspects of user interface 200.

FIG. 2B illustrates another view of user interface 200, view 220. Illustrated in FIG. 2B are specific indications which can be generated or displayed on the user interface responsive to information, indications 260 and 270. Although the example given in FIG. 2B is illustrative, other examples of indications can include that a new rollout or version of software has been installed, a change in traffic pattern, elevated loss of packets, increased latency in the network, or other changes in the network have occurred.

In other examples, the system can be tuned such that a total contribution of changes in specific traffic parameters, such as packet counts, or latency, or loss, collectively is significant. Thus, in some examples, the system can monitor for a collective or multi-factor change in the system to determine an anomalous condition rather than only monitoring individual changes in the parameters.

Figure 3:
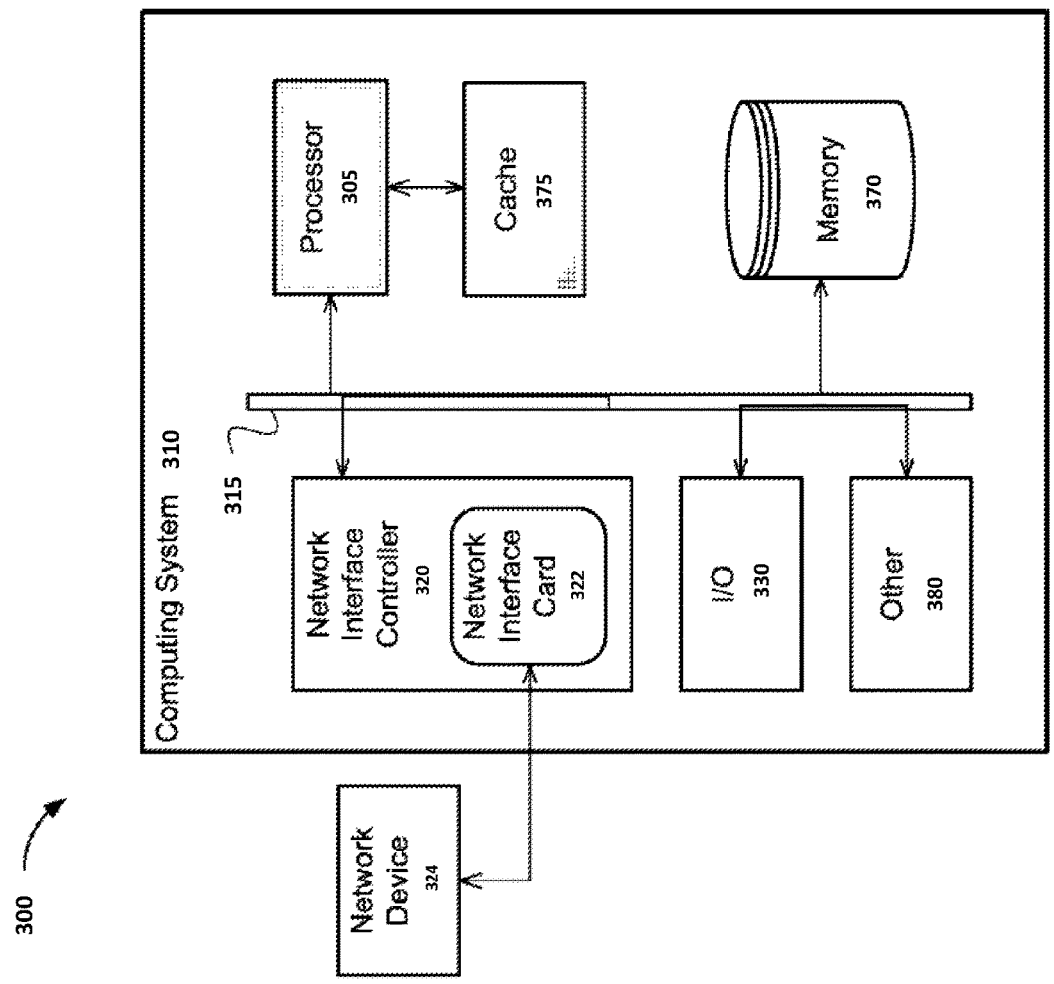
FIG. 3 illustrates aspects of an example computing system.

FIG. 3 is a block diagram 300 illustrating an example computer system 310 with which aspects of this disclosure, including machine learning system 110 and any components thereof, can be implemented. In certain aspects, the computer system 310 may be implemented using hardware or a combination of software and hardware, either in a dedicated server, or integrated into another entity, or distributed across multiple entities. In some examples, example computing system 310 can be a user computing system or device. In other examples, cloud 101 can consist of one or more example computer systems, similar to computing system 310, coupled or linked via software and hardware components to operate collectively as a cloud.

In broad overview, the computing system 310 includes at least one processor 350 for performing actions in accordance with instructions and one or more memory devices 370 or 375 for storing instructions and data. The illustrated example computing system 310 includes one or more processors 350 in communication, via a bus 315, with at least one network interface driver controller 320 with one or more network interface cards 322 connecting to one or more network devices 324, memory 370, and any other devices 380, e.g., an I/O interface. The network interface card 322 may have one or more network interface driver ports to communicate with the connected devices or components. Generally, a processor 350 executes instructions received from memory. The processor 350 illustrated incorporates, or is directly connected to, cache memory 375.

In more detail, the processor 350 may be any logic circuitry that processes instructions, e.g., instructions fetched from the memory 370 or cache 375. In many embodiments, the processor 350 is a microprocessor unit or special purpose processor. The computing device 310 may be based on any processor, or set of processors, capable of operating as described herein. The processor 350 may be a single core or multi-core processor. The processor 350 may be multiple processors. In some implementations, the processor 350 can be configured to run multi-threaded operations. In some implementations, the processor 350 may host one or more virtual machines or containers, along with a hypervisor or container manager for managing the operation of the virtual machines or containers. In such implementations, the methods shown and described in FIGS. 4-6 can be implemented within the virtualized or containerized environments provided on the processor 350.

The memory 370 may be any device suitable for storing computer readable data. The memory 370 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 310 may have any number of memory devices 370. In some implementations, the memory 370 supports virtualized or containerized memory accessible by virtual machine or container execution environments provided by the computing system 310.

The cache memory 375 is generally a form of computer memory placed in close proximity to the processor 350 for fast read times. In some implementations, the cache memory 375 is part of, or on the same chip as, the processor 350. In some implementations, there are multiple levels of cache 375, e.g., L2 and L3 cache layers.

The network interface driver controller 320 manages data exchanges via the network interface driver 322 (also referred to as network interface driver ports). The network interface driver controller 320 handles the physical and data link layers of the OSI model for network communication. In some implementations, some of the network interface driver controller's tasks are handled by the processor 350. In some implementations, the network interface driver controller 320 is part of the processor 350. In some implementations, a computing system 310 has multiple network interface driver controllers 320. The network interface driver ports configured in the network interface card 322 are connection points for physical network links. In some implementations, the network interface controller 320 supports wireless network connections and an interface port associated with the network interface card 322 is a wireless receiver/transmitter. Generally, a computing device 310 exchanges data with other network devices 324 via physical or wireless links that interface with network interface driver ports configured in the network interface card 322. In some implementations, the network interface controller 320 implements a network protocol such as Ethernet.

The other network devices 324 are connected to the computing device 310 via a network interface driver port included in the network interface card 322. The other network devices 324 may be peer computing devices, network devices, or any other computing device with network functionality. For example, a first network device 324 may be a network device such as a hub, a bridge, a switch, or a router, connecting the computing device 310 to a data network such as the Internet or Cloud 101 shown in FIG. 1.

The other devices 380 may include an I/O interface, external serial device ports, and any additional co-processors. For example, a computing system 310 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 300 includes an additional device 380 such as a coprocessor, e.g., a math co-processor can assist the processor 350 with high precision or complex calculations.

Instructions on computing system 310 may control various components and functions of computing system 310. For example, the instructions may be executed to perform any of the methods indicated in this disclosure. In some examples, algorithms can be included as a subset of or otherwise as part of instructions included on computing system 310. Instructions can include algorithms to execute any of the methods or a subset of the methods described within this disclosure.

User interfaces on the computing system 310 may include a screen which allows a user to interact with computing system 310, such as a touch screen or buttons. A display can also be included such as an LCD, LED, mobile phone display, electronic ink, or other display to display information about computing system 310. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 310 to be updated and information generated by computing system 310 to be shared to other devices. In some examples, communication interface(s) can send information stored in memory to another user device for display, storage or further analysis.

Example Methods

As explained below, the following methods can be used to detect network anomalies which are generally applicable, scalable, dynamic, and customizable. In some examples, the methods and algorithms described herein can be performed on systems described in reference to FIGS. 1-3, such as for example, computer system 310 or monitoring module 150.

As described herein, anomalies on the network can refer to unexpected behavior related to the network, such as for example, a change in network traffic, throughput, user demand, number of users accessing a portion of the network, high loss, latency, a significant spike of ingress packets, a drop in packets, or changes in packet flows. Further, as explained herein, an anomaly can be any behavior which significantly differs from previous behavior. In some examples, from a mathematical perspective, a network anomaly is any network event whose predicted probability is below a certain threshold. Although in some contexts, the difference can be considered "good" such as when latency or loss is reducing, but the difference can still trigger an anomaly. Certain types of behavior or changes can be filtered for based on predefined information.

Figure 4:
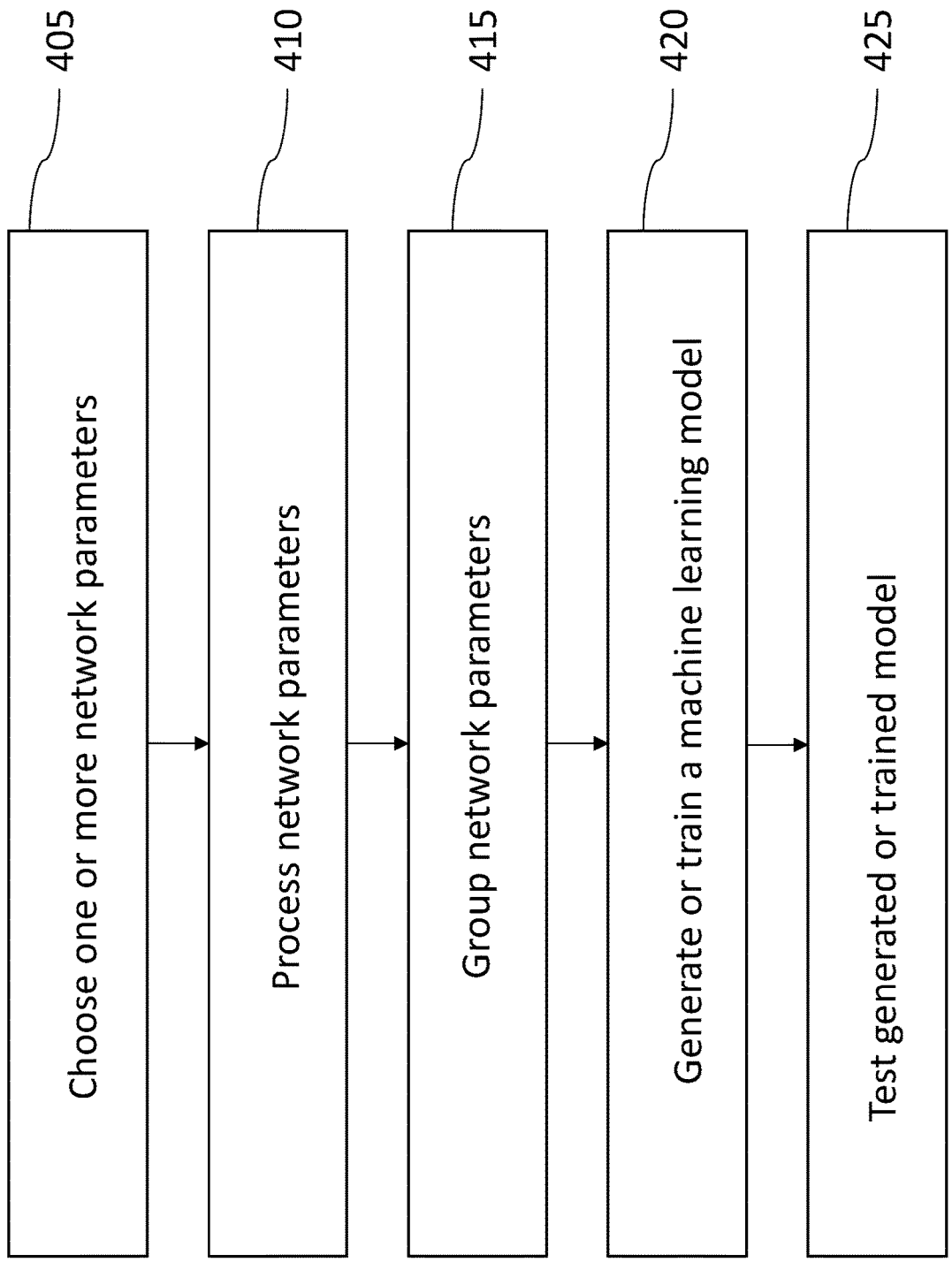
FIG. 4 illustrates aspects related to an example method to train a machine learning model for network detection.

FIG. 4 illustrates a flow chart of an example method 400 to train or generate a machine learning model. Additional details regarding specific machine learning techniques are discussed in detail elsewhere.

At block 405, one or more network parameters can be obtained. Examples of network parameters include information or parameters such as, for example, IP address, Subnet Mask, default Gateway, DNS Server and Host Name, node status, public or private cloud, throughput, response time, waiting time, network topology, average traffic data, time series analysis of network. Other examples can include: Round trip time (RTT) which is, roughly speaking, the time it takes for a network packet to get from a source to a destination and an acknowledgement of delivery to the destination at the source; packet retransmits, which are events where a packet is resent by the sender due to either a request by the receiver to resend it or due to timeout in which no acknowledgement was received by the source of packet; packet size distribution; number of new connections; and rate of increase or decrease in the number of connections. In some examples, the parameters can be considered or treated as a time-series related to the network.

In some examples, the one or more network parameters can be associated with different types of data described with respect to FIG. 1B (e.g. "sample data", "network data" "VM specific data"). In some examples, a subset of the network parameters can be used in conjunction with training of a specific machine learning model. For example, network parameters that are not user specific, such as sample data or network data, (e.g. latency) can be used to train model which is not user specific while other types of data, such as "VM specific data" described with respect to FIG. 1B, can be used to train specific modules or train specific machine learning models.

In some examples, each network parameter can be associated with a network state, such as "normal" or "anomalous." In some examples, the parameters may not normally be collected during operation of a cloud, such as cloud 101, but specified to be observed or collected by hypervisor 140 or other cloud components. In other examples, the parameters can be requested from the virtual machines that sit within cloud 101. In other examples, the parameters can be associated with user input or a user indication of the status or behavior of the state, such as "normal," "anomalous," or "suspicious."

At block 410, network parameters can be processed. In some examples, processing of the network parameters includes normalizing the parameters. In some examples, the parameters can be combined or joined with a known state of the network. In other examples, the received parameters can be weighted. In some examples, the weighting can be done automatically or responsive to machine learning techniques. In other examples, certain important parameters can be identified by human intervention and given a relative weight to the other parameters, such as for example, latency, reordering of network packets, flow count, number of connections. In other examples, based on the aggregation of the different parameters mentioned here, it is possible to estimate the number of connections and the rate of new connections. This can then be used to identify anomalous events such as denial of service attack or server misconfigurations. In some examples, deep neural networks can be used, which can "automate" the feature generation process. In other ML techniques, features are suggested by a human observer, relying on, among other things, statistically importance, and the observed impact on the trained model.

At block 415, network parameters can be grouped, clustered, or classified based on known characteristics of the network parameters. In some examples, a characteristic of the parameter can include information about whether the network is in an anomalous state or in a normal operating state. In some examples, this information can be obtained from a stimulated network. In other examples, this information can be obtained from historically collected information which has been marked by a human operator as being anomalous or normal. In yet other examples, this information can be obtained from a network using randomized information. In some examples, the network parameters can be classified based on types of networks. The classification can be based on predetermined parameters or based on evolving and adaptive parameters, such as those generated by additional machine learning techniques, such as generative adversarial networks, neural networks, or machine learning classification techniques.

At block 420, one or more machine learning models can be generated or trained based on blocks 405-415. Techniques to generate or train a machine learning model are described below.

At block 425, one or more machine learning models can be tested for accuracy in a test environment. In this example, various validation techniques can be used to determine the accuracy of the generated or trained models. In some examples, test cases can be used to determine if the machine learning model is appropriate for detecting anomalies. In addition, statistical information about the expected performance of the model can be generated, such as, the amount of expected false positives or false negatives. This information can be utilized in providing confidence intervals to users or cloud administrators if desired.

Figure 5:
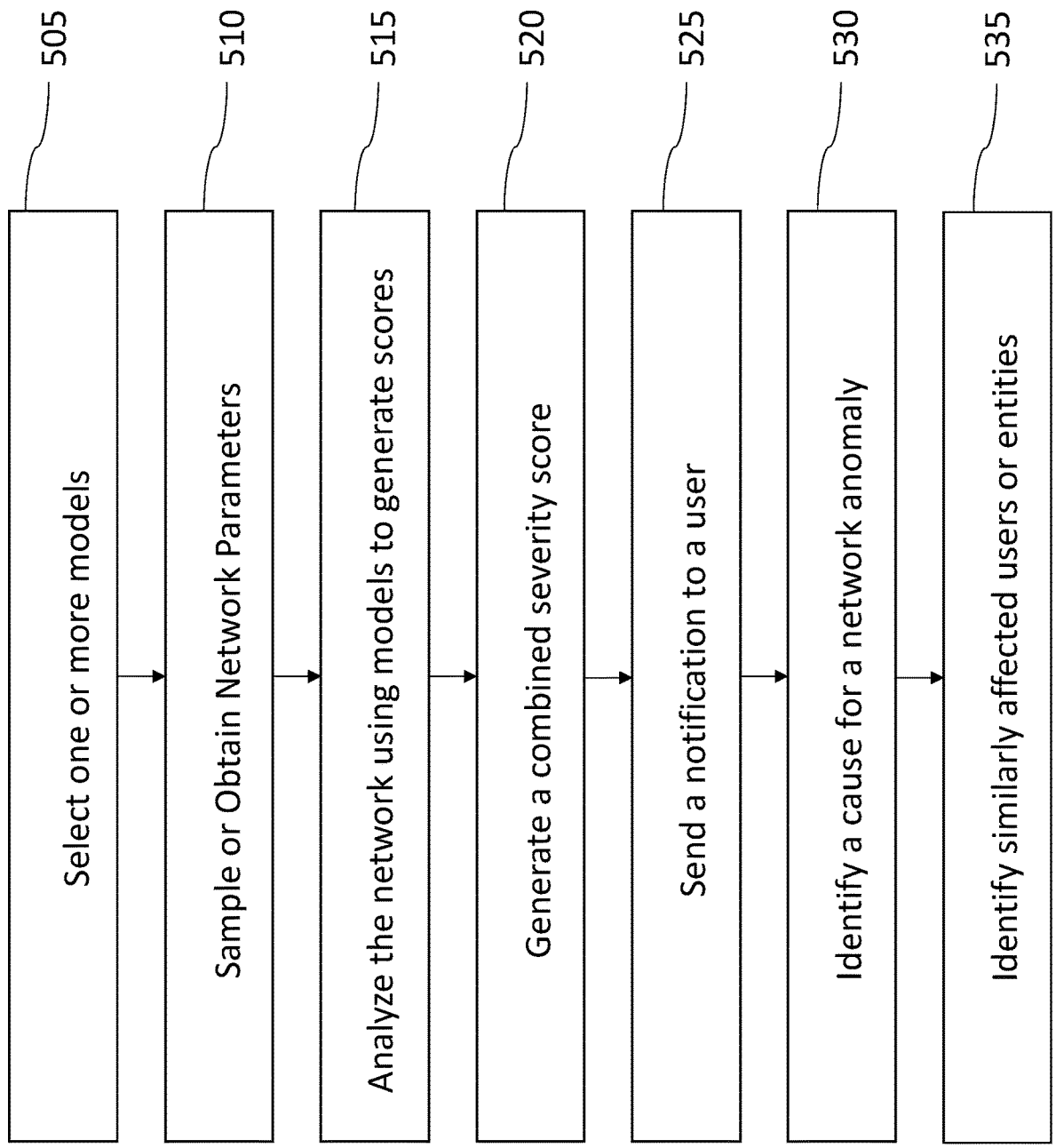
FIG. 5 illustrates aspects related to an example method to identify a state of the network.

FIG. 5 illustrates a flowchart of an example method 500 to identify a state of the network.

At block 505, one or more models can be selected to be used for identification of anomalous network events or the state of a network. In some examples, the selection of models to be used for monitoring the network can be done in real time or at fixed intervals. In other examples, the models can be selected based on the information related to the user, such as for example, the size of the virtual machines or cloud resources used by the user, important characteristics identified by a user and made known to the cloud or cloud components, the security sensitivity of a virtual machine belonging to a user, or predicted or expected network traffic for a particular virtual machine or user. In yet other examples, the models used can be based on prior feedback from a user regarding anomalous events. In yet other examples, the models can be selected by a machine learning algorithm based on classification techniques to most closely match the most appropriate models to a specific user, virtual machine, or group of virtual machines. In some examples, a determination of which model to use can be trained based on a set of data or information related to a specific user, virtual machine, or group of virtual machines and a model chosen by a user when that data was obtained or generated. In some examples, the determination can be generalized through training a machine learning model which is trained on the aforementioned data to generalize characteristics for selecting which model would be used at different times. In some examples, different models can represent or be associated with different time frames, such as within the past day, week, or last hour, with different network parameters, or with a different set of aggregated cloud elements, such as a set of virtual machines. As one example, one model can be used to determine the combined behavior of the set of VMs of a specific customer in a specific cloud location or a physical location over the past 7 days. Another model can present the combined behavior for all VMs that have communication to external sources (users outside the cloud) in the last hour. Information from these models can be aggregated into a score or be an input for an additional model.

At block 510, network parameters for detecting the state of a network can be sampled or obtained. The network parameters to be studied can be based on the models selected above. In some examples, certain parameters may not be available, in which case, certain models can not be used as part of determining the state of a network. In some examples, a subset of the network can be sampled or used for the model to create efficiencies in the data processing.

At block 515, the network parameters can be analyzed by the models selected at block 505. The relative weighting of the models can be tuned based on feedback obtained from the user as described in this disclosure. In other examples, certain models selected for specific critical events can be incorporated or used to generate a binary output, where the binary output can indicate the presence or absence of the critical event. For example, a critical event can be a discrete event or combination of discrete events, such as unauthorized access to the network, exceeding or meeting a fixed percentage of network resources purchased by a user, or an infrastructure issue that may cause packet loss, such as a network packet being dropped by a middle router or server. The specific critical events can be configured or selected by a user. In some examples, these critical events can be sent directly to a user device upon being detected. In other examples, the models used can generate one or more scores related to the network, such as critical event score 161, ML score 162, customer user model score 163.

At block 520, the parameters or scores generated at block 515 by the one or more models can be aggregated to generate a combined severity score. A severity score can be a single score indicative of the operational status of the network. In other examples, the severity score can be a computer readable message which encodes various aspects of network behavior.

In some examples, the severity score can be an aggregation of what is known or estimated about the network. The severity score can be estimated based on the severity of the anomaly, such as how unlikely the event is, what percentage of VMs, groups of virtual machines, servers, or other group of computing entities or resources. For example, any granularity of a group of machines can be used, including those representing physical entities such as hosts and clusters, and including those representing virtual entities, such as groups of VMs belonging to the same project. an anomaly impacted, the duration of an anomaly or event, or any combination of other parameters. Alternatively, it can be computed based on multiple models or data inputs such as computing two or more anomaly scores. One score can be based on a score or model per virtual machine and one which is based on groups of virtual machines. A second score can be anomaly data in combination with data from a specific user's or customer's configuration of a virtual machine. It is possible to determine that the anomaly score computed on the groups of VMs has more meaning and to give it a higher weight when computing the severity score.

In another example, one or more determined scores can be combined or used to determine a severity score. For example, ML Score 162, Customer User Model Score 163, and Critical Event Score 161 can be combined into combined severity score 170.

At block 525, a notification can be sent to a user device. The notification can be for example similar to table 230, alert 240, alert 250, or indications 260 or 270. The notification can be configured to cause a change in a user device receiving the notification. The notification may be formatted in a manner that is easily interpreted by humans. The notification may include the probability a single network entity may fail, as well as the probabilities a group of network entities may fail. In other examples, the notification can be configured to receive feedback from the user. This information received can be used to update or train the machine learning models and scoring logic described herein.

At block 530, various techniques, including but not limited to reverse engineering techniques, can be used to identify the specific cause for a network anomaly. In some examples, this can be done with specific machine learning techniques, such as for example, generative adversarial networks. A generative adversarial network (GAN) can generate a list of potential causes for a network anomaly based on the information obtained in the network anomaly. In some examples, a GAN, or other machine learning technique will work when the characteristics of the anomaly are correlated with the cause, and a machine learning algorithm can "learn" or identify the correlation. In some examples, at this block time correlations between the anomalous network event and other related events can be made. The other related events can be, for example, deploying a new software version, known hardware malfunction, software malfunctions due to new software on a virtual machine, software malfunction in a virtual machine component (e.g. hypervisor), a virus, sudden change in user traffic, possibly due to a change in network architecture. In some examples, all machines that are anomalous at a particular time or similar time can be analyzed to identify a common feature to the machines. The identified features can contain a strong indication of the cause of the anomaly.

At block 535, additional users or entities affected by the network anomaly can be identified. In some examples, if an anomaly is detected in a particular type of user, or geographical area, similarly situated users, entities, or virtual machines can be checked for the same network anomaly. In this example, other users can be provided a notification indicating that similar events have occurred. For example, if 90% of the anomalous VMs have a specific version, or communicate with a specific country, and/or go through a network product like a load balancer or VPN, those virtual machines sharing those characteristics can be identified as affected. In other examples, a common denominator can be identified to extract the base root, extracting a timeline, identifying a cascading effect caused by a network outage and pin-point the root cause. One method which can be used to achieve the aforementioned is to use a clustering based technique, such as those described herein. Clustering can be applied on the different characteristics of the known affected VMs. This process results in one or more profiles of affected VMs and then other VMs with the same profile can be verified to be suffering from the same event.

Figure 6:
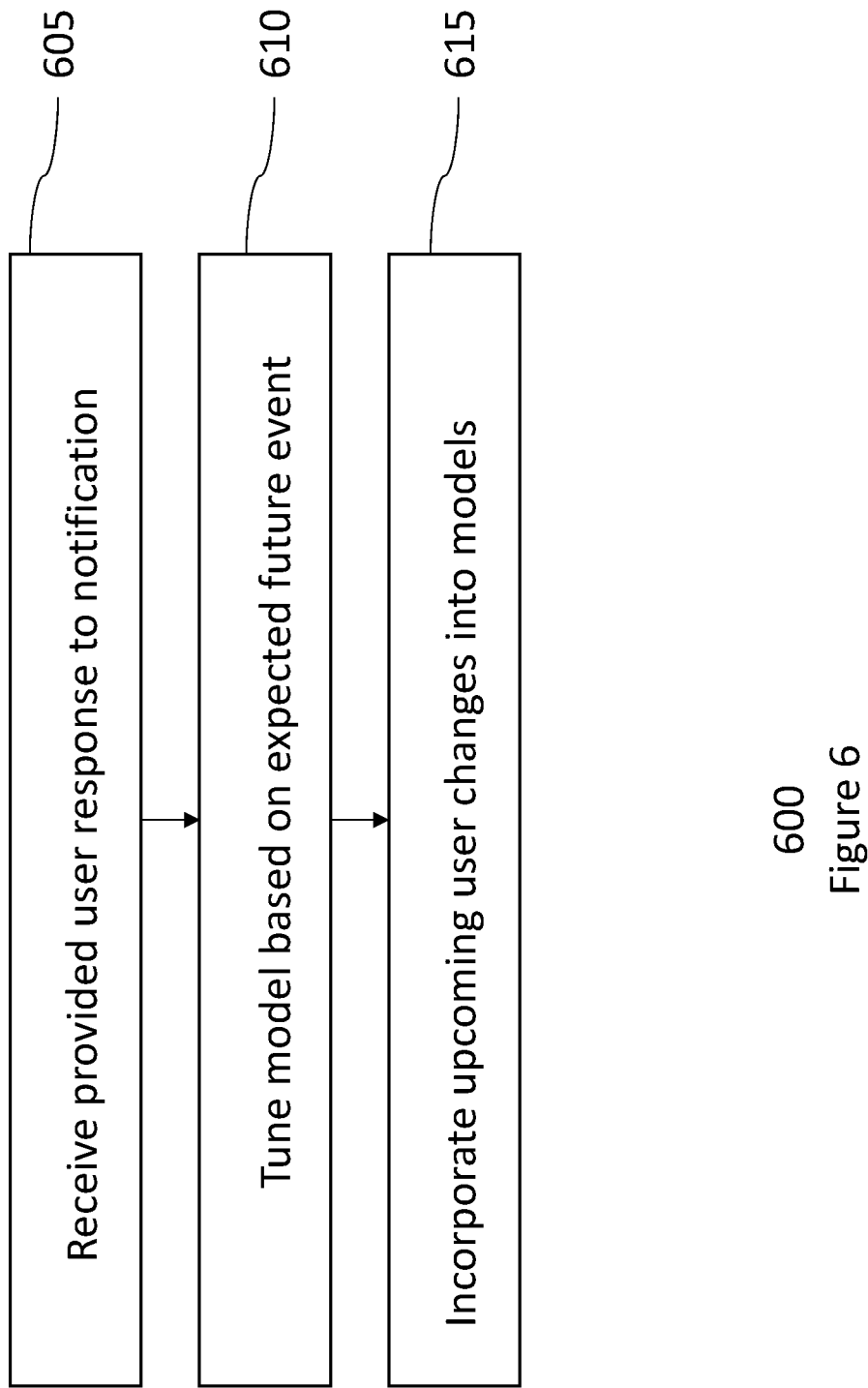
FIG. 6 illustrates aspects related to an example method to tune levels of anomaly detection and the state of the network.

FIG. 6 illustrates a flowchart of an example method 600 to tune levels of anomaly detection and the state of the network.

At block 605, responses or feedback from the user to prior or current notifications provided to the user can be provided. In some examples, a customized set of user preferences can be generated based on the received feedback. In some examples, a set of user preferences can be generated based on the At block 610, a future expected event can be used to tune or change the level of accepted anomalies or threshold over which an event is identified as anomalous. For example, an increase in network traffic can be expected close to certain social events, such as Christmas, Thanksgiving, a release of a highly coveted video game, or a sporting event such as the Superbowl, Olympics, or Cricket World Cup. The types of changes to the network can be accounted for in the algorithms and methods described herein to detect anomalous events. In certain machine learning examples, such events are accounted for during the learning and training process of the machine learning network. In some examples, computing devices can be connected to a server containing or storing such information, which can be automatically provided to the algorithms described herein.

At block 615, upcoming user changes can be incorporated into the scoring and machine learning algorithms described herein. For example, a user can indicate that a certain piece of software will be changed on his or her virtual machine, which can cause a change to traffic patterns on the virtual machine. In other examples, the specific upgrade or change to the user's virtual machine may not be known to the cloud provider. In this example, changes to the traffic patterns of the virtual machine can be analyzed to determine if they correspond to typical changes made to a virtual machine, such as for example, an update to an operating system.

In some examples, datacenter or cloud parameters can change over time. For example, hardware or software changes, such as to hypervisor 140 can be made over time. In these examples, it is possible to retrain models or tune models to respond to this change to avoid false positives of network anomalies.

In some examples, notifications generated by the methods described herein can also be stored into a log, accessible by a user or a cloud administrator. The log itself can be analyzed or used to modify the thresholds or machine learning techniques described above. For example, if for a certain customer of a virtual machine or cloud network, a number of anomalous events is large, the thresholds and focus on the most significant events can be reduced. In other examples, the logs described above can be compared to an activity report of the user applications, and using machine learning or other correlation techniques, the quality of reported events can be improved.

Example Machine Learning, Statistical, Probabilistic, and Model Creation Methods In some examples, one or more of the following techniques can be used as part of the disclosed technology.

In some examples, probabilistic methods can be used. For example, a Gaussian mixture model can be used. Gaussian mixture models are a probabilistic model for representing normally distributed subpopulations within an overall population. In a Gaussian mixture model, it is not required that an observed set of data should characterize or state which subpopulation a particular observation within the distribution belongs to.

Example machine learning techniques which can be used include the following.

In some examples, a mix of supervised learning techniques and unsupervised learning techniques can be used.

In some examples, generative adversarial networks can be used to predict or detect network anomalies. Generative adversarial networks use two networks, one adversarial and one generative, in an attempt to fool the adversarial network by objects generated by the generative network.

In some examples, clustering methods can be used to cluster inputs, network parameters, trained models, or virtual machines. Clustering methods can be used in real time to classify and match models or groups of models with virtual machines or groups of virtual machines. Clustering can be an unsupervised machine learning technique in which the algorithm can define the output. One example clustering method is "K_Means" where K represents the number of clusters that the user can choose to create. Various techniques exist for choosing the value of K, such as for example, the elbow method.

Some other examples of techniques include dimensionality reduction. Dimensionality reduction can be used to remove the amount of information which is least impactful or statistically least significant. In networks, where a large amount of data is generated, and many types of data can be observed, dimensionality reduction can be used in conjunction with any of the techniques described herein. One example dimensionality reduction method is principle component analysis (PCA). PCA can be used to reduce the dimensions or number of variables of a "space" by finding new vectors which can maximize the linear variation of the data. PCA allows the amount of information lost to also be observed and for adjustments in the new vectors chosen to be made. Another example technique is t-Stochastic Neighbor Embedding (t-SNE).

Ensemble methods can be used, which primarily use the idea of combining several predictive models, which can be supervised ML or unsupervised ML to get higher quality predictions than each of the models could provide on their own. As one example, random forest algorithms Neural networks and deep learning techniques can also be used for the techniques described above. Neural networks generally attempt to replicate the behavior of biological brains in turning connections between an input and output "on" or "off" in an attempt to maximize a chosen objective.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Aspects of the disclosed technology can include any combination of the following features:

Feature 1. A method of obtaining a state of a network, or determining an anomalous state of a network, the method comprising:
obtaining data related to network parameters;
evaluating a current state of the network, based on the obtained data, by using at least a first model;
providing to a user device, an actionable notification, upon determining that the evaluated state of the network meets a predetermined state or providing to a user device, an actionable notification, upon determining that the evaluated state of the network meets a predetermined state differing from a normal state of the network;
wherein the actionable notification indicates the current state of the network; and
wherein the first model is trained using machine learning to establish a baseline behavior of the network or wherein the first model is a trained machine learning model, the first model having been trained on prior network data to enable the first model to evaluate at least a normal state of the network.

Feature 2. The method of feature 1 wherein a second model or multiple models are selected and used to evaluate the state of the network.

Feature 3. The method of features 1-2 wherein the first model and a second model used to evaluate the current state of the network are selected or adjusted according to the presence of a condition internal to the network or a condition external to the network.

Feature 4. The method of features 1-3 wherein evaluating the current state of the network comprises at least one of:
a. aggregating or generating a severity score based on multiple models;
b. evaluating a portion of virtual machines or groups of virtual machines impacted by an event within the network;
c. evaluating the presence of an event based on a comparison of a network parameter or a group of network parameters or to a threshold value; or
d. evaluating the presence of an event based on an aggregation of the network parameters for a group of virtual machines and a comparison of the aggregated network parameters to a threshold value.

Feature 5. The method of features 1-4 wherein the predetermined state is an anomalous state or a user defined state.

Feature 6. The method of features 1-5 further comprising automatically taking an action upon determining the current state of the network meets a particular predetermined state.

Feature 7. The method of features 1-6 wherein the first model is trained or retrained based on the parameters of the network elements.

Feature 8. The method of feature 7 wherein the first model is re-trained upon a change in a virtual machine hosted on the network.

Feature 9. The method of feature 1-8 wherein obtaining network parameters comprises obtaining network parameters in real-time.

Feature 10. The method of feature 1-9 the actionable notification causes a user's network or virtual machine to perform an action.

Feature 11. The method of feature 10 wherein the action is one of: (i) restarting the network, (ii) changing security protocols, (iii) changing firewall rules, (iv) stopping or slowing egress or ingress of traffic.

Feature 12. The method of features 1-11 wherein the machine learning of the first model comprises generating weights for network parameters and evaluating the network involves evaluating multiple network parameters simultaneously.

Feature 13. The method of features 2-12 wherein a cause for the anomalous network condition can be determined using the evaluated current state of the network and the data related to the network parameters.

Feature 14. The method of features 1-13 wherein the evaluation of the current state of the network can distinguish between an anomalous condition for the network and a malfunction within a virtual machine or group of virtual machines corresponding to a user of the network.

Feature 15. The method of features 1-14 wherein feedback to the actionable notification is used to adjust a threshold used in evaluating the current state of the network or to retrain the first model.

Feature 16. A non-transient computer readable medium containing program instructions, the instructions when executed perform the steps of:
obtaining data related to network parameters;
evaluating the current state of the network, based on the obtained data, by using at least one a first model;
providing to a user device, an actionable notification, upon determining that the evaluated state of the network meets a predetermined state; and
wherein the actionable notification indicates the current state of the network; and wherein the first model is trained using machine learning.

Feature 17. The computer readable medium containing program instructions of feature 16, wherein a second model or multiple models are used to evaluate the state of the network responsive to a user response to the actionable notification.

Feature 18. The computer readable medium containing program instructions of features 16-17 wherein the first model and a second model used to evaluate the current state of the network are dynamically selected or adjusted according to the presence of a condition internal to the network or a condition external to the network.

Feature 19. The computer readable medium containing program instructions of features 16-18 wherein the machine learning of the first model comprises generating weights for network parameters and evaluating the network involves evaluating multiple network parameters simultaneously.

Feature 20. The computer readable medium containing program instructions of features 16-19 wherein the predetermined state is an anomalous state.

Feature 21. The computer readable medium containing program instructions of features 19-20 wherein a cause for the anomalous network state can be determined using the evaluated current state of the network and the data related to the network parameters.

The invention claimed is:

1. A method of detecting states of a network, the method comprising:
    selecting at least a first model for detecting a current state of the network based on a given virtual machine;
    obtaining data related to network parameters based on at least the first model;
    evaluating a current state of the network, based on the obtained data, by using at least the first model; and
    providing to a user device, an actionable notification, upon determining that the evaluated current state of the network meets a predetermined state differing from a normal state of the network;
    wherein the actionable notification indicates the current state of the network; and
    wherein the first model is a trained machine learning model, the first model having been trained on prior network data to enable the first model to evaluate at least a normal state of the network, the prior network data including a dataset of underlying software being used on theft given virtual machine.

2. The method of claim 1 further comprising selecting multiple models for detecting the current state of the network based on the given virtual machine.

3. The method of claim 1 wherein selecting at least the first model for detecting the current state of the network is further based on a machine learning model configured to match at least the first model to the given virtual machine.

4. The method of claim 1 wherein evaluating the current state of the network comprises at least one of determining a presence of an event impacting the given virtual machine that is indicative of the current state of the network differing from the normal state of the network.

5. The method of claim 1 wherein the predetermined state is an anomalous state or a user defined state.

6. The method of claim 1 further comprising automatically taking an action upon determining the current state of the network meets a particular predetermined state.

7. The method of claim 1 wherein the prior network data comprises prior data related to the network parameters.

8. The method of claim 1 wherein the first model is re-trained upon a change in the given virtual machine.

9. The method of claim 1 wherein obtaining network parameters comprises obtaining network parameters in real-time.

10. The method of claim 1 wherein the actionable notification causes an action to be performed on the network.

11. The method of claim 10 wherein the action comprises at least one of: restarting the network, changing security protocols, changing firewall rules, or stopping or slowing egress or ingress of traffic.

12. The method of claim 1 wherein the training of the first model comprises generating weights for network parameters of the prior network data.

13. The method of claim 1 wherein a cause for the current state of the network differing from the normal state of the network can be determined using the evaluated current state of the network and the obtained data related to the network parameters.

14. The method of claim 1 wherein the evaluation of the current state of the network distinguishes between an anomalous condition for the network and a malfunction within the given virtual machine.

15. The method of claim 1 wherein feedback to the actionable notification is used to adjust a threshold used in evaluating the current state of the network or to retrain the first model.

16. A non-transient computer readable medium containing program instructions that, when executed, perform steps for detecting states of a network, the steps comprising:
    selecting at least a first model for detecting a current state of the network based on a given virtual machine;
    obtaining data related to network parameters based on at least the first model;
    evaluating the current state of the network, based on the obtained data, by using at least the first model; and
    providing to a user device, an actionable notification, upon determining that the evaluated current state of the network meets a predetermined state differing from a normal state of the network;
    wherein the actionable notification indicates the current state of the network; and
    wherein the first model is trained using machine learning, the first model having been trained on prior network data to enable the first model to evaluate at least a normal state of the network, the prior network data including a dataset of underlying software being used on the given virtual machine.

17. The non-transient computer readable medium of claim 16 wherein the steps further comprise selecting multiple models for detecting the current state of the network based on the given virtual machine.

18. The non-transient computer readable medium of claim 16 wherein selecting at least the first model for detecting the current state of the network is further based on a machine learning model configured to match at least the first model to the given virtual machine.

19. The non-transient computer readable medium of claim 16 wherein the training of the first model comprises generating weights for network parameters of the prior network data.

20. The non-transient computer readable medium of claim 16 wherein the predetermined state is an anomalous state.

* * * * *